United States Patent
Han et al.

(10) Patent No.: US 9,268,318 B2
(45) Date of Patent: Feb. 23, 2016

(54) AIR CONDITIONER, METHOD FOR CONTROLLING OUTDOOR UNITS THEREOF, AND CENTRAL CONTROL SYSTEM HAVING THE SAME

(75) Inventors: Jonghyun Han, Seoul (KR); Duckgu Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 661 days.

(21) Appl. No.: 13/352,489

(22) Filed: Jan. 18, 2012

(65) Prior Publication Data
US 2012/0191255 A1 Jul. 26, 2012

(30) Foreign Application Priority Data
Jan. 21, 2011 (KR) .......................... 10-2011-0006541

(51) Int. Cl.
*G05B 15/02* (2006.01)
*B60H 1/00* (2006.01)
*F24F 11/00* (2006.01)

(52) U.S. Cl.
CPC ............ *G05B 15/02* (2013.01); *B60H 1/00821* (2013.01); *F24F 11/006* (2013.01); *F24F 2011/0064* (2013.01); *F24F 2011/0067* (2013.01); *G05B 2219/2642* (2013.01)

(58) Field of Classification Search
CPC ...................... F24F 11/0009; F24F 2011/0064; F24F 2011/0067; F24F 11/0006; G05B 2219/2642; G05B 15/02; B60H 1/00821
USPC ..................... 700/276; 236/51; 714/E11.023
See application file for complete search history.

(56) References Cited

U.S. PATENT DOCUMENTS

| | | | | |
|---|---|---|---|---|
| 7,974,740 B2* | 7/2011 | Kim et al. | ..................... | 700/276 |
| 2006/0106912 A1* | 5/2006 | Kim et al. | ..................... | 709/203 |
| 2006/0230262 A1* | 10/2006 | Jansen et al. | ..................... | 713/2 |
| 2007/0101393 A1* | 5/2007 | Ito | ..................... | 725/132 |
| 2008/0185448 A1* | 8/2008 | Kim et al. | ..................... | 236/51 |
| 2009/0138866 A1* | 5/2009 | Veillette et al. | ..................... | 717/168 |

FOREIGN PATENT DOCUMENTS

| | | |
|---|---|---|
| CN | 1889481 A | 1/2007 |
| KR | 10-2006-0119297 A | 11/2006 |
| KR | 10-2009-0078565 A | 7/2009 |

* cited by examiner

*Primary Examiner* — Robert Fennema
*Assistant Examiner* — Fenyang Stewart
(74) *Attorney, Agent, or Firm* — Dentons US LLP

(57) ABSTRACT

Disclosed are an air conditioner, a method for controlling outdoor units thereof, and a central control system having the same. A mode conversion unit such as a boot loader is provided to perform a mode conversion between a driving control mode and an upgrade mode in a software manner, without requiring a user's visit to the site. This may allow an outdoor unit control program to be remotely upgraded. In the present disclosure, the air conditioner may return to a previous mode or previous program in the occurrence of an error on an upgrade signal or upgrade program.

13 Claims, 6 Drawing Sheets

AIR CONDITIONER, METHOD FOR CONTROLLING OUTDOOR UNITS THEREOF, AND CENTRAL CONTROL SYSTEM HAVING THE SAME

CROSS-REFERENCE TO RELATED APPLICATION

This application claims the benefit of Korean Patent Application No. 10-2011-0006541, filed on Jan. 21, 2011, which is hereby incorporated by reference for all purposes as if fully set forth herein.

BACKGROUND OF THE DISCLOSURE

1. Field of the Disclosure

The present disclosure relates to an air conditioner which upgrades an outdoor unit control program during an operation, a method for controlling outdoor units thereof, and a central control system having the same.

2. Background of the Disclosure

Recently, as facilities of buildings become modernized, much required is an automatic control system for automatically controlling sub systems installed in the buildings, such as power, lighting, air conditioners, facilities for damage prevention, and facilities for crime prevention. And, a central control system, such as a Building Management System (BMS) for integrally controlling the sub systems, is being actively developed.

Generally, an air conditioner is provided with indoor units and outdoor units, and drives a cooling cycle and a heating cycle according to a user's request. The indoor units and the outdoor units are connected to each other through a refrigerant pipe. A recent air conditioning system may include a controller for controlling a plurality of multi air conditioners through connection therebetween.

The recent air conditioner is provided with an air conditioner controller or a gateway for an enhanced efficiency in buildings such as companies and schools where the air conditioner has been adopted. That is, as a function of an outdoor unit of the recent air conditioner is improved, a large number of indoor units are commonly connected to the outdoor unit. And, a plurality of multi air conditioners are integrally controlled by the air conditioner controller. The recent air conditioner is further provided with a remote central control server for remotely controlling multi air conditioners. The remote central control server is configured to control the multi air conditioners, or to monitor state information or driving information, etc. of the multi air conditioners.

In the conventional air conditioner, a dip switch is provided at a microcomputer board of outdoor units so that an outdoor unit control program can be upgraded and the completely upgraded program can be executed. More concretely, a user directly connects a communication line to the outdoor units, and performs a mode conversion by using a dip switch. Then, the user upgrades the control program by sending a control program to the outdoor units. Then, the user executes the upgraded control program by re-performing a mode conversion by using the dip switch. And, the user operates the outdoor units in the converted mode by resetting the microcomputer board.

However, the conventional air conditioner may have the following problems.

In order to upgrade a program for controlling outdoor units installed on the spot, a user has to visit the spot to connect the outdoor units with a device in which the program has been stored.

Furthermore, in a case that the outdoor units are not reset after a mode conversion, the outdoor units may not operate.

SUMMARY OF THE DISCLOSURE

Therefore, an aspect of the detailed description is to provide an air conditioner having a plurality of indoor units and one or more outdoor units for driving the indoor units, and capable of easily upgrading an outdoor unit control program while the outdoor units are operated, a method for controlling the outdoor units thereof, and a central control system having the same.

Another aspect of the detailed description is to provide an air conditioner capable of remotely controlling an outdoor control program by allowing a mode conversion unit provided at outdoor units to perform a mode conversion between a driving control mode and an upgrade mode in a software manner, a method for controlling the outdoor units thereof, and a central control system having the same.

To achieve these and other advantages and in accordance with the purpose of this specification, as embodied and broadly described herein, there is provided an air conditioner comprising: a plurality of indoor units configured to perform an air conditioning operation; and one or more outdoor units connected to a central control server through a network, driven by a control program, and configured to drive the indoor units based on the control program, wherein the outdoor unit includes a mode conversion unit configured to select a mode between a driving control mode for driving the outdoor unit and the indoor units by execution of the control program, and an upgrade mode for upgrading the control program.

The outdoor unit may further include a communication unit configured to receive an upgrade signal and an upgrade control program from the central control server; a storage unit configured to store the control program; and a controller configured to execute the control program according to the driving control mode, or configured to delete the control program and to store the upgrade control program in the storage unit according to the upgrade mode.

The mode conversion unit may be configured to check a mode being currently executed by the outdoor unit once the outdoor unit has received the upgrade signal, and to convert the current mode into the upgrade mode.

The mode conversion unit may be configured to check a mode to be executed by the outdoor unit once power has been supplied to the outdoor unit, and to set the outdoor unit to a mode between the driving control mode and the upgrade mode.

And, the mode conversion unit may be configured to determine an error of the upgrade signal, and to maintain the outdoor unit in the driving control mode in the occurrence of an error of the upgrade signal.

The storage unit may include a backup region where the controller backs up a previous control program. In the occurrence of an error while the upgrade control program is being executed, the controller may restore the control program backed up in the backup region of the storage unit.

According to another aspect of the present disclosure, the air conditioner may further comprise a gateway connected to the central control server through the network, connected to the outdoor unit through a dedicated line, and configured to control the central control server to directly control the outdoor unit and the indoor units, or configured to control the outdoor unit and the indoor units according to a control algorithm thereof.

To achieve these and other advantages and in accordance with the purpose of this specification, as embodied and broadly described herein, there is also provided a method for controlling outdoor units of an air conditioner, the air conditioner having a mode conversion unit in the outdoor unit, the mode conversion unit configured to set the outdoor unit to a mode between a driving control mode for driving the outdoor unit and indoor units by execution of a control program, and an upgrade mode for upgrading the control program, the method comprising: a signal receiving step of receiving an upgrade signal by the outdoor unit; an upgrade mode setting step of setting, by the mode conversion unit, the outdoor unit to the upgrade mode according to the upgrade signal; a control program upgrading step of upgrading the control program by the outdoor unit; and a driving control mode setting step of setting, by the mode conversion unit, the outdoor unit to the driving control mode upon completion of the control program upgrading.

The method for controlling outdoor units of an air conditioner may further comprise a mode check step of checking, by the mode conversion mode, a mode to be executed by the outdoor unit once power has been supplied to the outdoor unit; and an outdoor unit setting step of setting, by the mode conversion unit, the outdoor unit to a mode between the driving control mode and the upgrade mode according to a check result.

To achieve these and other advantages and in accordance with the purpose of this specification, as embodied and broadly described herein, there is still also provided a central control system, comprising: an air conditioner including a plurality of indoor units configured to perform an air conditioning operation, and including one or more outdoor units having a mode conversion unit, driven by a control program, and configured to drive the indoor units based on the control program; and a central control server connected to the air conditioner through a network, and configured to control the air conditioner and to provide an upgrade control program to the outdoor unit, wherein the mode conversion unit is configured to drive the outdoor unit by selecting a mode between a driving control mode for driving the outdoor unit and the indoor units by execution of the control program, and an upgrade mode for upgrading the control program into the upgrade control program.

According to another aspect of the present disclosure, the central control system may further comprise a gateway connected to the central control server through the network, connected to the air conditioner through a dedicated line, and configured to control the central control server to directly control the air conditioner, or configured to control the air conditioner according to a control algorithm thereof.

The present disclosure may have the following advantages.

Firstly, a user, etc. may easily upgrade an outdoor unit control program while the outdoor unit is being operated, without visiting the spot.

Secondly, the mode conversion unit provided at the outdoor unit may perform a mode conversion between a driving control mode and an upgrade mode in a software manner. This may allow an outdoor unit control program to be remotely upgraded. As the outdoor unit control program is remotely controlled, a time duration and costs of upgrading may be reduced, and a user's convenience and a system stability may be enhanced.

Thirdly, in the occurrence of an error of an upgrade signal or an upgrade program, a previous mode or a previous program may be executed. This may prevent the air conditioner from being stopped operating. Furthermore, a mode conversion may be performed by a boot loader, the control program may be easily executed.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
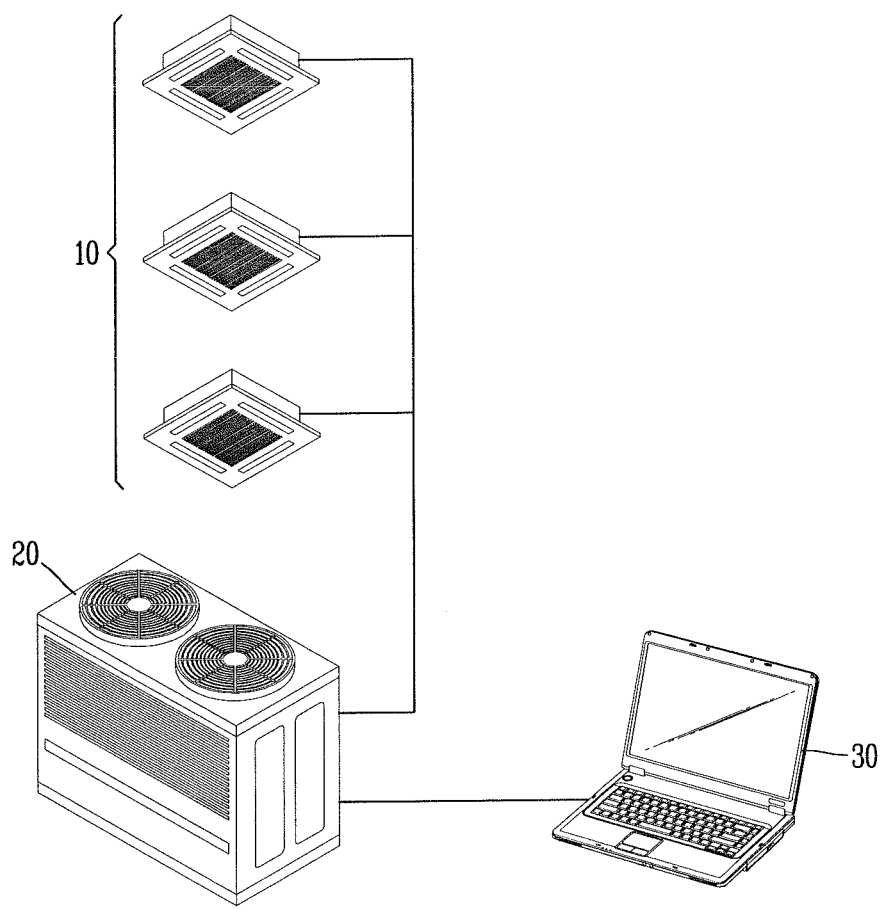
FIG. 1 is a view for explaining an operation to update a program for outdoor units in an air conditioner in accordance with the conventional art.
Figure 2:
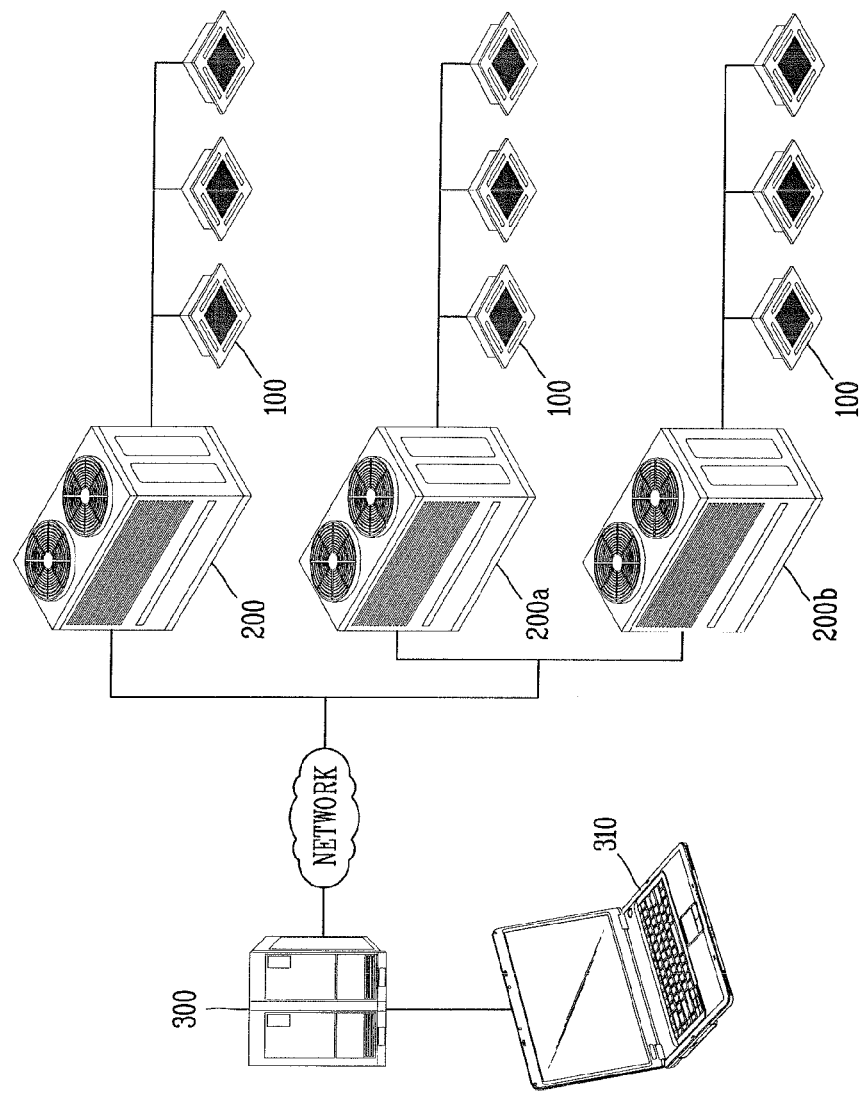
FIGS. 2 and 3 are views showing a configuration of a central control system according to present disclosure.

Referring to FIG. 2, a central control system according to a first embodiment of the present disclosure comprises an air conditioner, and a central control server 300. The air conditioner includes a plurality of indoor units 100 which perform an air conditioning function, and one or more outdoor units 200 having a mode conversion unit, driven by a control program, and configured to drive the indoor units by the control program. The central control server 300 is connected to the air conditioner through a network, thereby controlling the air conditioner and providing an upgrade control program to the outdoor units 200.

The outdoor unit 200 may be configured as one outdoor unit 200a, or may be configured as two outdoor units 200a and 200b connected to each other. To each outdoor unit, one or more indoor units are connected. In a case that the air conditioner includes two or more outdoor units 200a and 200b, one of the outdoor units may be operated as a master outdoor unit and another may be operated as a slave outdoor unit.

Figure 3:
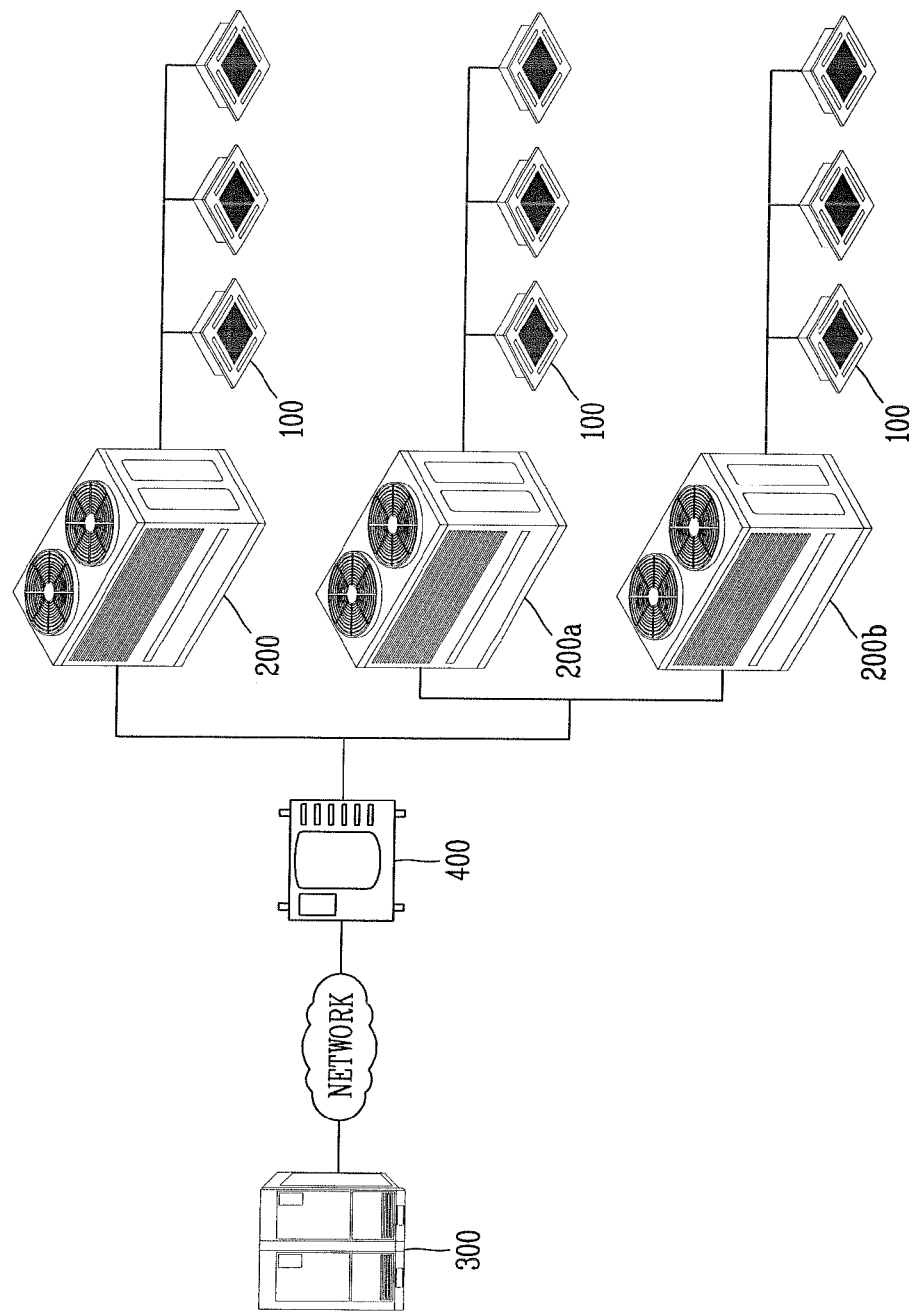

Referring to FIG. 3, a central control system according to another embodiment of the present disclosure comprises an air conditioner, a central control server 300, and a gateway 400. The gateway 400 is connected to the central control server 300 through the network, and is connected to the air conditioner through a dedicated line. And, the gateway 400 is configured to control the central control server to directly control the air conditioner, or configured to control the air conditioner according to a control algorithm thereof.

The gateway is connected to each outdoor unit through a dedicated line such as RS-485, or through LAN (Local Area Network), thereby sending and receiving data. The gateway 400 is connected to the central control server 300 through a network such as Internet, thereby receiving a control program with respect to the outdoor units and the indoor units. And, the gateway 400 is configured to control the central control server to directly control the outdoor units and the indoor units, or configured to control the outdoor units and the indoor units according to a control algorithm thereof.

Referring to FIGS. 2 and 3, the air conditioner according to the present disclosure includes a plurality of indoor units 100 which perform an air conditioning function, and one or more outdoor units 200 connected to an external central control server through a network, driven by a control program, and configured to drive the indoor units by the control program.

Figure 4:
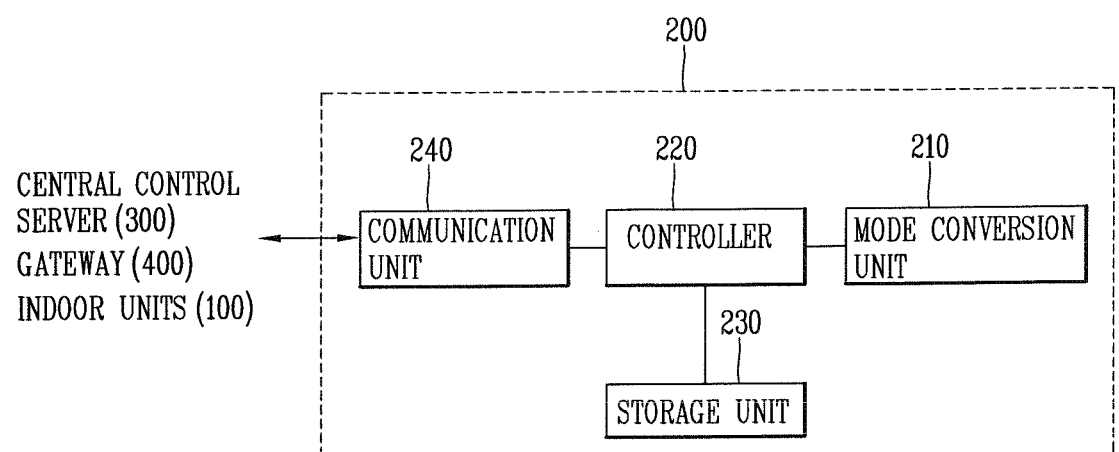
FIG. 4 is a block diagram showing a detailed configuration of outdoor units of FIGS. 2 and 3.

Referring to FIG. 4, the outdoor unit 200 includes a mode conversion unit 210 configured to select a mode between a driving control mode for driving the outdoor unit and the indoor units by execution of the control program, and an upgrade mode for upgrading the control program.

Referring to FIG. 4, the outdoor unit further includes a communication unit 240, a storage unit 230 and a controller 220. The communication unit 240 is configured to receive an upgrade signal and an upgrade control program from the central control server 300. The storage unit 230 is configured to store the control program and the upgrade control program. The controller 220 is configured to execute the control program according to the driving control mode, or configured to delete the control program and to store the upgrade control program in the storage unit according to the upgrade mode.

The mode conversion unit 210 may be a boot loader. Once the outdoor unit has received an upgrade signal while the outdoor control program is being executed, the boot loader may perform a mode conversion between the driving control mode and the upgrade mode according to the upgrade signal. The mode conversion unit 210 is configured to check a mode being currently executed by the outdoor unit 200 once the outdoor unit 200 has received the upgrade signal, and to convert the current mode into the upgrade mode. More concretely, if the outdoor unit 200 receives an upgrade signal during an operation, the mode conversion unit 210 converts the current mode of the outdoor unit into the upgrade mode.

Once power has been supplied to the outdoor unit, the mode conversion unit 210 checks a mode to be executed by the outdoor unit, and sets the outdoor unit to a mode between the driving control mode and the upgrade mode. The mode conversion unit 210 is configured to set the outdoor unit to an upgrade mode when an upgrade signal has been received at the time of an initial driving or re-driving of the outdoor unit, but is configured to set the outdoor unit to a driving control mode when no upgrade signal has been received.

Also, the mode conversion unit 210 determines whether an error has occurred on the upgrade signal, and allows the outdoor unit to maintain the driving control mode in the occurrence of an error. The mode conversion unit 210 performs a mode conversion according to whether an error has occurred on an upgrade signal. More concretely, if an error has occurred on an upgrade signal received by the outdoor unit, the mode conversion unit 210 does not convert the current mode of the outdoor unit into an upgrade mode, but allows the outdoor unit to maintain the original mode (driving control mode). In this case, the mode conversion unit 210 may be configured to generate a response signal with respect to the upgrade signal. If no response signal has been received, the gateway 400 or the central control server 300 determines that an error has occurred on the upgrade signal, and re-sends the upgrade signal to the outdoor unit 200.

As one example, the storage unit 230 may include a backup region where the controller backs up a previous control program. In the occurrence of an error while the upgrade control program is being executed, the controller 220 may restore the control program backed up in the backup region of the storage unit.

As another example, if a storage capacity, i.e., a memory capacity of the storage unit 230 is small, the previous control program may be stored in the gateway 400 or the central control server 300. In the occurrence of an error while the upgrade control program is being executed, the controller 220 sends the error-occurred signal to the gateway 400 or the central control server 300 through the communication unit 240. Upon reception of the error-occurred signal, the gateway 400 or the central control server 300 removes the upgrade control program and restores the previous control program.

Whether an error has occurred on the upgrade signal or upgrade control program may be determined by an algorithm which checks a data error, such as a cyclic redundancy check (CRC) and a check sum. A communication protocol, a data format, etc. for sending and receiving data are well known, and thus detailed explanations thereof will be omitted.

Figure 5:
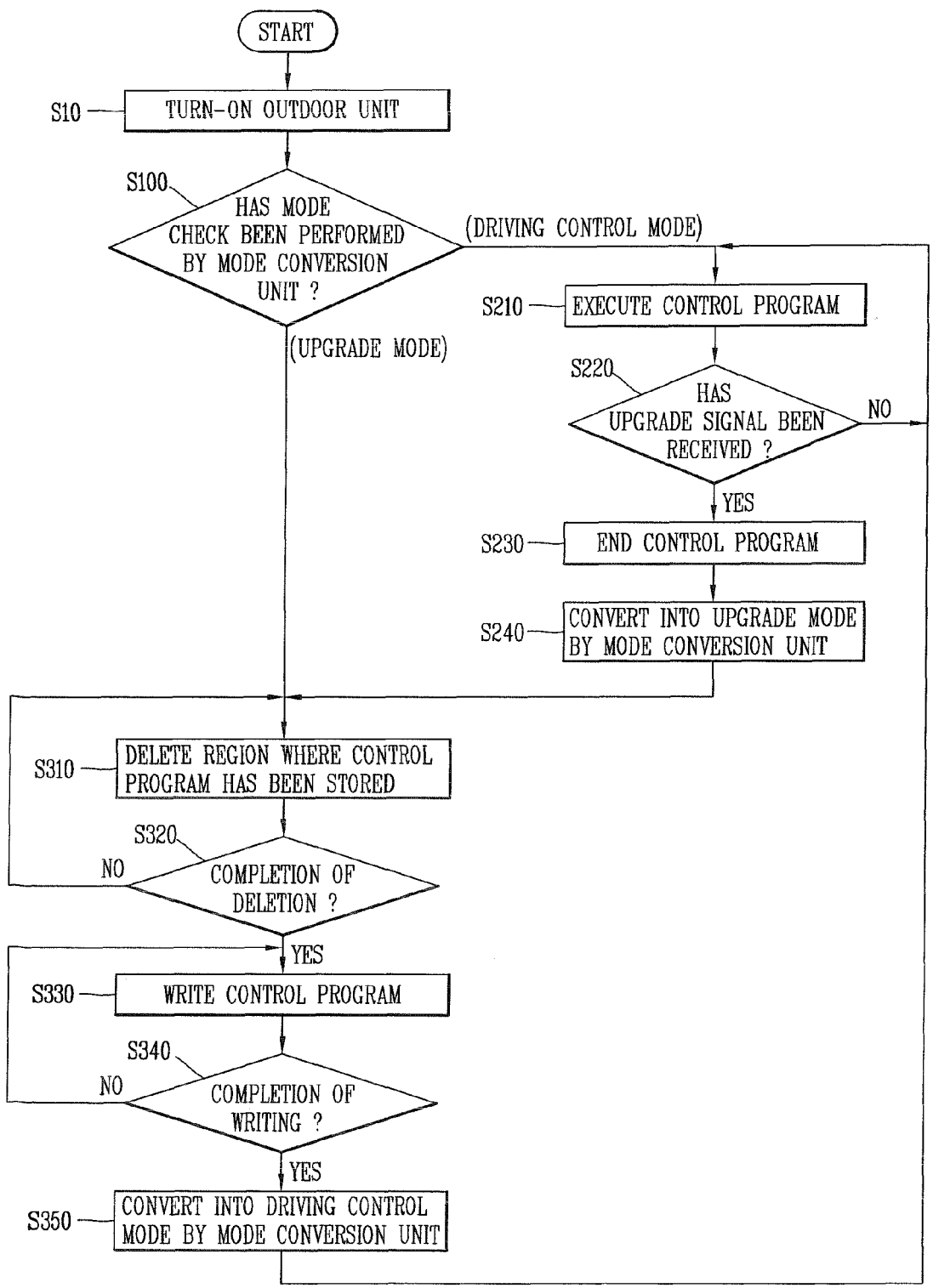
FIG. 5 is a flowchart schematically showing a method for controlling outdoor units of an air conditioner according to a first embodiment of the present disclosure.

Referring to FIG. 5, a method for controlling outdoor units of an air conditioner according to one embodiment of the present disclosure comprises a signal receiving step (S220) of receiving an upgrade signal by an outdoor unit, an upgrade mode setting step (S240) of setting, by the mode conversion unit, the outdoor unit to an upgrade mode according to an upgrade signal, a control program upgrading step (S310 or S340) of upgrading a control program by the outdoor unit, and a driving control mode setting step (S350) of setting, by the mode conversion unit, the outdoor unit to a driving control mode upon completion of the control program upgrading. The air conditioner is provided, in the outdoor unit, a mode conversion unit configured to set the outdoor unit to a mode between a driving control mode for driving the outdoor unit and the indoor units by execution of the control program in the outdoor unit, and an upgrade mode for upgrading the control program. Configurations of a device may be understood with reference to FIGS. 2 to 4.

The method for controlling outdoor units of an air conditioner may further comprise a mode check step (S100) of checking, by the mode conversion mode, a mode to be executed by the outdoor unit once power has been supplied to the outdoor unit, and an outdoor unit setting step of setting, by the mode conversion unit, the outdoor unit to a mode between the driving control mode and the upgrade mode according to a check result. Once power has been supplied to the outdoor unit, the outdoor unit turns on (S10). The mode conversion unit checks a mode to be executed by the outdoor unit, and sets the outdoor unit to a mode between the driving control mode and the upgrade mode. The mode conversion unit 210 is configured to set the outdoor unit to an upgrade mode when an upgrade signal has been received at the time of an initial driving or re-driving of the outdoor unit, but is configured to set the outdoor unit to a driving control mode when no upgrade signal has been received.

Figure 6:
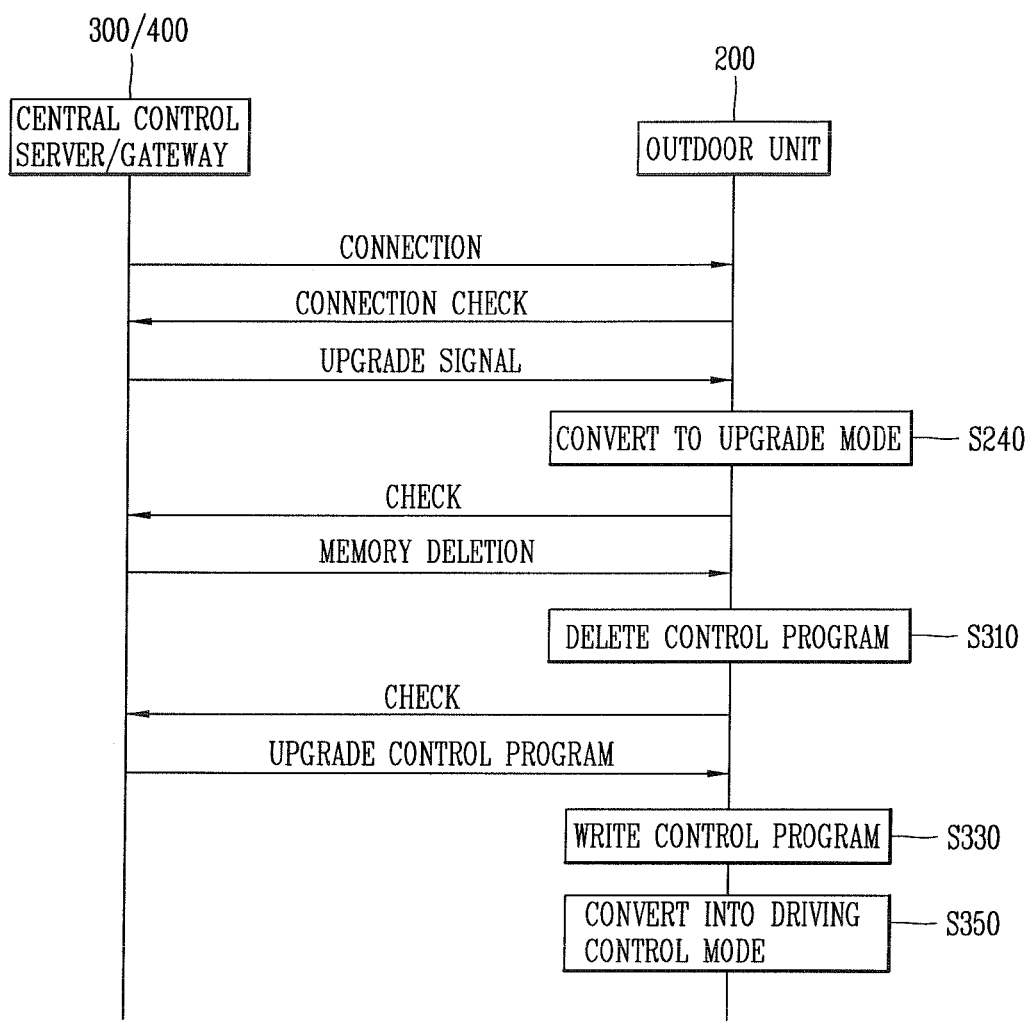
FIG. 6 is a view for explaining a communication operation between a central control server or a gateway and outdoor units of FIG. 5.

Referring to FIGS. 5 and 6, while the air conditioner drives the outdoor unit by execution of a control program (S210), the central control server 300 or the gateway 400 sends, to the outdoor unit 200, a signal requesting to check whether the outdoor unit 200 has been connected thereto. Then, the outdoor unit sends a response signal to the central control server or the gateway. Upon reception of the response signal, the central control server or the gateway sends an upgrade signal to the outdoor unit 200. The outdoor unit 200 receives the upgrade signal (S220), and the mode conversion unit terminates the control program being currently executed (S230), and converts the current mode of the outdoor unit 200 into an upgrade mode (S240). The outdoor unit sends a mode conversion acknowledgement signal to the center control server or the gateway. Then, the central control server or the gateway upgrades the outdoor unit control program. For instance, the central control server or a user's terminal connected to the central control server deletes a region where an outdoor unit control program being currently executed has been stored (S310). Upon completion of deleting the region (S320), the central control server or the user's terminal records and stores an upgrade control program in an outdoor unit storage unit (S330). Upon completion of writing (S340), the mode conversion unit converts the current mode of the outdoor unit into a driving control mode (S350). The controller drives the indoor units and the outdoor units by using the upgrade control program. Here, the outdoor unit determines whether an error has occurred on the upgrade control program, and sends an error-occurred signal to the central control server. Upon reception of the error-occurred signal, the central control server re-sends the upgrade control program to the outdoor unit 200. The outdoor unit executes the existing control program backed up in one region of the storage unit 230 or stored in the gateway or central control server.

As aforementioned, in the present disclosure, the mode conversion unit such as a boot loader is provided to perform a mode conversion between a driving control mode and an upgrade mode in a software manner, without requiring a user's visit to the site. This may allow an outdoor unit control program to be remotely upgraded, and the system to return to the previous mode or previous program in the occurrence of an error on an upgrade signal or upgrade program.

What is claimed is:

1. An air conditioner, comprising:
a plurality of indoor units configured to perform an air conditioning operation;
one or more outdoor units driven by a control program, and configured to drive the indoor units based on the control program; and
a gateway connected to an external central control server through a network, and connected to the outdoor unit through a dedicated line;
wherein the gateway is configured to control the central control server to directly control the outdoor unit and the indoor units, or configured to control the outdoor unit and the indoor units according to a control algorithm thereof,
wherein the outdoor unit is connected to the central control server through the gateway, and is configured to receive an upgrade signal and an upgrade control program from the central control server or the gateway, and includes a mode conversion unit configured to select a mode between a driving control mode for driving the outdoor unit and the indoor units by execution of the control program, and an upgrade mode for upgrading the control program,
wherein the mode conversion unit is configured to check a mode to be executed by the outdoor unit once power has been supplied to the outdoor unit and to set the outdoor unit to the upgrade mode when an upgrade signal has been received at the time of an initial driving or re-driving of the outdoor unit, and to set the outdoor unit to the driving control mode when no upgrade signal has been received,
wherein the mode conversion unit is configured to determine an error of the upgrade signal, and to maintain the outdoor unit in the driving control mode in the occurrence of the error of the upgrade signal, and configured to generate a response signal with respect to the upgrade signal,
wherein the central control server or the gateway, determines that the error has occurred on the upgrade signal, if no response signal has been received, and re-sends the upgrade signal to the outdoor unit.

2. The air conditioner of claim 1, wherein the outdoor unit further includes:
a communication unit configured to receive the upgrade signal and the upgrade control program from the central control server or the gateway;
a storage unit configured to store the control program; and
a controller configured to execute the control program according to the driving control mode, or configured to delete the control program and to store the upgrade control program in the storage unit according to the upgrade mode.

3. The air conditioner of claim 2, wherein the mode conversion unit is configured to check a mode being currently executed by the outdoor unit once the outdoor unit has received the upgrade signal, and to convert the current mode into the upgrade mode.

4. The air conditioner of claim 2, wherein the storage unit includes a backup region where the controller backs up a previous control program.

5. The air conditioner of claim 4, wherein in the occurrence of an error while the upgrade control program is being executed, the controller sends an error-occurred signal to the gateway or the central control server through the communication unit, and upon reception of the error-occurred signal, the gateway or central control server removes the upgrade control program and restores the previous control program backed up in the backup region of the storage unit.

6. The air conditioner of claim 1, wherein the mode conversion unit is a boot loader.

7. A method for controlling outdoor units of an air conditioner, the air conditioner having a mode conversion unit in the outdoor unit, the mode conversion unit configured to set the outdoor unit to a mode between a driving control mode for driving the outdoor unit and indoor units by execution of a control program, and an upgrade mode for upgrading the control program, the method comprising:
a signal receiving step of receiving an upgrade signal from an external central control server by the outdoor unit;
an upgrade mode setting step of setting, by the mode conversion unit, the outdoor unit to the upgrade mode according to the upgrade signal;
a control program upgrading step of upgrading the control program by the outdoor unit; and
a driving control mode setting step of setting, by the mode conversion unit, the outdoor unit to the driving control mode upon completion of the control program upgrading;
whereby the outdoor unit determines whether an error has occurred on the upgrade control program, and sends an error-occurred signal to the central control server,
whereby the central control server re-sends the upgrade control program to the outdoor unit, upon reception of the error-occurred signal.

8. The method of claim 7, further comprising a mode check step of checking, by the mode conversion mode, a mode to be executed by the outdoor unit once power has been supplied to the outdoor unit; and an outdoor unit setting step of setting, by the mode conversion unit, the outdoor unit to a mode between the driving control mode and the upgrade mode according to a check result.

9. A central control system, comprising:

an air conditioner including a plurality of indoor units configured to perform an air conditioning operation, and including one or more outdoor units having a mode conversion unit, driven by a control program, and configured to drive the indoor units based on the control program;

a central control server connected to the air conditioner through a network, and configured to control the air conditioner and to provide an upgrade control program to the outdoor unit; and a gateway connected to the central control server through the network, connected to the air conditioner through a dedicated line, and configured to control the central control server to directly control the air conditioner, or configured to control the air conditioner according to a control algorithm thereof;

wherein the outdoor unit is configured to receive an upgrade signal and an upgrade control program from the central control server or the gateway, wherein the mode conversion unit is configured to drive the outdoor unit by selecting a mode between a driving control mode for driving the outdoor unit and the indoor units by execution of the control program, and an upgrade mode for upgrading the control program into the upgrade control program, and to determine an error of the upgrade signal, and to maintain the outdoor unit in the driving control mode in the occurrence of the error of the upgrade signal, and configured to generate a response signal with respect to the upgrade signal, wherein the central control server or the gateway, determines that the error has occurred on the upgrade signal, if no response signal has been received, and re-sends the upgrade signal to the outdoor unit.

10. The central control system of claim 9, wherein the outdoor unit further includes:

a communication unit configured to receive the upgrade signal and the upgrade control program from the central control server or the gateway;

a storage unit configured to store the control program; and a controller configured to execute the control program according to the driving control mode, or configured to delete the control program and to store the upgrade control program in the storage unit according to the upgrade mode.

11. The central control system of claim 10, wherein the mode conversion unit is configured to check a mode being currently executed by the outdoor unit once the outdoor unit has received the upgrade signal, and to convert the current mode into the upgrade mode.

12. The central control system of claim 10, wherein the mode conversion unit is configured to check a mode to be executed by the outdoor unit once power has been supplied to the outdoor unit, and to set the outdoor unit to a mode between the driving control mode and the upgrade mode.

13. The central control system of claim 10, wherein the storage unit includes a backup region where the controller backs up a previous control program, and wherein in the occurrence of an error while the upgrade control program is being executed, the controller restores the control program backed up in the backup region of the storage unit.

* * * * *